United States Patent
Schaper et al.

(10) Patent No.: US 10,961,986 B2
(45) Date of Patent: Mar. 30, 2021

(54) METHOD FOR COOLING A GEARLESS WIND TURBINE

(71) Applicant: Wobben Properties GmbH, Aurich (DE)

(72) Inventors: Ulf Schaper, Staffhorst (DE); Kai Enskonatus, Hinte (DE); Wojciech Giengiel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/604,522

(22) PCT Filed: Apr. 5, 2018

(86) PCT No.: PCT/EP2018/058719
§ 371 (c)(1),
(2) Date: Oct. 10, 2019

(87) PCT Pub. No.: WO2018/189023
PCT Pub. Date: Oct. 18, 2018

(65) Prior Publication Data
US 2020/0149514 A1    May 14, 2020

(30) Foreign Application Priority Data
Apr. 12, 2017  (DE) .................... 10 2017 107 897.5

(51) Int. Cl.
*F03D 7/00*   (2006.01)
*F03D 80/60*  (2016.01)
(Continued)

(52) U.S. Cl.
CPC .......... *F03D 80/60* (2016.05); *F03D 7/0272* (2013.01); *F03D 15/20* (2016.05); *H02K 7/1838* (2013.01);
(Continued)

(58) Field of Classification Search
CPC ........ F03D 80/60; F03D 15/20; F03D 7/0272; H02K 11/25; H02K 7/1838; H02K 9/04;
(Continued)

(56) References Cited

U.S. PATENT DOCUMENTS

| 6,541,877 B2 | 4/2003 | Kim et al. |
| 7,098,550 B2 | 8/2006 | Wobben |

(Continued)

FOREIGN PATENT DOCUMENTS

| CN | 103181066 A | 6/2013 |
| CN | 103609017 A | 2/2014 |

(Continued)

*Primary Examiner* — Julio C. Gonzalez
(74) *Attorney, Agent, or Firm* — Seed Intellectual Property Law Group LLP (57) ABSTRACT

A method for controlling a gearless wind turbine, wherein the wind turbine comprises a generator having a stator and a rotor and an air gap therebetween which has an air gap thickness, wherein the generator is designed as an internal rotor, with the stator as an outer part and the rotor as an inner part, or the generator is designed as an external rotor, with the rotor as an outer part and the stator as an inner part, said method comprising the following steps: detecting a temperature of the outer part as an outer part temperature, detecting a temperature of the inner part as an inner part temperature, calculating a temperature difference as the difference between the outer part temperature and the inner part temperature, and controlling the generator according to the temperature difference such that a reduction in the air gap thickness by thermal expansion of the generator is counteracted.

18 Claims, 4 Drawing Sheets

(51) Int. Cl.
*F03D 15/20* (2016.01)
*F03D 7/02* (2006.01)
*H02K 11/25* (2016.01)
*H02K 7/18* (2006.01)
*H02K 9/04* (2006.01)
*H02K 9/19* (2006.01)

(52) U.S. Cl.
CPC ............... *H02K 9/04* (2013.01); *H02K 9/19* (2013.01); *H02K 11/25* (2016.01)

(58) Field of Classification Search
CPC .. H02K 9/19; H02K 1/185; F05B 2270/3032; Y02E 10/725; Y02E 10/723; Y02E 10/721; Y02E 10/722
USPC ...................................... 290/44, 55
See application file for complete search history.

(56) References Cited

U.S. PATENT DOCUMENTS

| | | | |
|---|---|---|---|
| 8,653,703 B2 | 2/2014 | Kori et al. | |
| 8,729,722 B2* | 5/2014 | Damen | H02K 7/1838 290/55 |
| 9,143,071 B2* | 9/2015 | Diedrichs | H02P 29/50 |
| 9,624,908 B2 | 4/2017 | Airoldi et al. | |
| 2014/0054897 A1 | 2/2014 | Casazza et al. | |
| 2014/0133985 A1* | 5/2014 | Mongeau | F16C 25/02 416/95 |
| 2015/0102605 A1 | 4/2015 | Giengiel | |
| 2015/0265987 A1 | 9/2015 | Kidd | |
| 2017/0214298 A1* | 7/2017 | Coldwate | H02K 3/28 |
| 2019/0390657 A1* | 12/2019 | Zeichfussl | H02P 6/06 |

FOREIGN PATENT DOCUMENTS

| | | | | |
|---|---|---|---|---|
| CN | 203722413 U | 7/2014 | | |
| CN | 105917179 A | 8/2016 | | |
| DE | 102014208791 A1 | 11/2014 | | |
| EP | 1237263 A2 | 9/2002 | | |
| EP | 2372881 A2 | 10/2011 | | |
| EP | 2852037 A1 * | 3/2015 | ............ | H02K 11/20 |
| EP | 2852037 A1 | 3/2015 | | |
| JP | 2000324755 A | 11/2000 | | |
| JP | 2806542 A1 | 11/2014 | | |
| RU | 2599411 C2 | 10/2016 | | |
| WO | 02/086313 A1 | 10/2002 | | |
| WO | 2004/034549 A1 | 4/2004 | | |

* cited by examiner

METHOD FOR COOLING A GEARLESS WIND TURBINE

BACKGROUND

Technical Field

The present invention relates to a method for controlling a gearless wind turbine. The present invention also relates to a wind turbine.

Description of the Related Art

Wind turbines are known and they convert kinetic energy from wind into electrical energy. For this purpose, they use a generator. In the case of a gearless generator, it has a generator rotor, which is directly coupled to an aerodynamic rotor of the wind turbine. This generator rotor consequently turns as slowly as the aerodynamic rotor of the wind turbine turns. As a result of this, such a gearless wind turbine often has a very large number of poles and has a large air gap diameter, which may be several meters and in the case of the largest gearless wind turbine at present, the E-126, even lies in the range of 10 meters, that is to say in the range of 30 feet.

At the same time, such an air gap should however also have as small a thickness as possible, which even with the large air gap diameters mentioned is only a few millimeters. If, during operation, that is to say when it is turning, the generator rotor comes too close to the stator, the air gap therefore becomes too small at one point, there is the risk of damage occurring. In order to prevent this, the air gap thickness may be monitored. If the air gap thickness is detected as too small in one area, protective measures can be taken, such as reducing the power output of the generator or if necessary even stopping the wind turbine.

In the case of gearless wind turbines, changing of the air gap thickness may also be caused by a thermal expansion of the inner part of the generator, that is to say for example by an expansion of the generator rotor if the generator is an internal rotor. A reduction in the thickness of the air gap therefore does not necessarily have to indicate a defect of the generator.

However, even in the case of such a thermal expansion of the inner part, a sensor monitoring the air gap thickness would respond and initiate the protective measures. Such a situation is however undesirable in principle and should be avoided.

The German Patent and Trademark Office has searched the following prior art in the priority application relating to the present PCT application: DE 10 2014 208 791 A1 and US 2014/0054897 A1.

BRIEF SUMMARY

Provided is a protective measure for a generator of a gearless wind turbine caused by thermal expansion of an inner part of the generator.

A method for controlling a gearless wind turbine is provided. This wind turbine has a generator with a stator and a generator rotor. Since it is a gearless wind turbine, the generator rotor is consequently directly coupled to an aerodynamic rotor of the wind turbine. The term generator rotor is therefore used for the generator in order to differentiate it better from the aerodynamic rotor of the wind turbine. Use of the term generator rotor is therefore not intended to imply any restriction of the type of generator.

Furthermore, the generator may be designed both as an internal rotor and an external rotor. If it is designed as an internal rotor, the generator rotor is intended to turn inside the stator, seen in the radial direction. The stator is therefore then an outer part with respect to the generator rotor and the generator rotor is an inner part.

If the generator is designed as an external rotor, the generator rotor is intended to turn outside the stator, seen radially, and consequently the generator rotor forms an outer part and the stator forms an inner part.

The method proposes detecting a temperature of the outer part as an outer part temperature and a temperature of the inner part as an inner part temperature. Particularly, a slot temperature may be detected here for the stator, that is to say a temperature in the slots in which the stator windings run. This would then be a temperature sensor for recording the outer part temperature in the case of an internal rotor or for recording the inner part temperature in the case of an external rotor.

On the generator rotor, the temperature may be recorded for example in the region of one or more pole shoes. Correspondingly, the inner part temperature would be recorded thereby in the case of an internal rotor and the outer part temperature would be recorded thereby in the case of the external rotor.

It is then proposed that the generator is controlled in dependence on a temperature difference between the outer part temperature and the inner part temperature, to be specific in such a way that a reduction in the air gap thickness due to thermal expansion of the generator is counteracted.

Consequently, a control that does not consider absolute temperatures, or not just absolute temperatures, but a temperature difference between the outer part temperature and the inner part temperature is proposed. It has particularly been recognized here that a reduction in the air gap thickness may occur if the inner part thermally expands to a greater extent than the outer part. In this case, it could therefore be unfavorable to cool the outer part as well as possible. Although it is generally advantageous to cool the generator in order to improve its characteristics, with regard to the air gap thickness the temperature difference is at least also a contributing factor.

According to one embodiment, it is consequently proposed that the outer part is cooled or heated in dependence on the temperature difference in such a way that the reduction in the air gap thickness is counteracted. Cooling the outer part in such a way that this reduction in the air gap thickness is counteracted may particularly mean that the cooling thereof is reduced, or to put it another way that the outer part is cooled so little, or not cooled at all, in such a way that the reduction in the air gap thickness is counteracted. It is therefore specifically taken into account that the outer part can likewise thermally expand. At least allowance is also made for this aspect. However, consideration is also given to the idea that the outer part is even actively heated, in order thereby to achieve a thermally induced expansion of the outer part.

If therefore, for example, the inner part thermally expands and this can no longer be counteracted by further cooling, a reduction in the air gap thickness can be prevented or can be counteracted by the outer part being heated.

According to one configuration, it is proposed that the outer part is cooled or heated in such a way that the outer part temperature lies below the inner part temperature at most by an undershooting temperature. Therefore, the temperature difference between the outer part temperature and the inner part temperature is considered. Allowance is then made for the undershooting temperature as a limit value. The outer part may therefore only be cooled to such an extent that, as a maximum, it is cooled below the inner part temperature by the value of the undershooting temperature. If its temperature falls below the inner part temperature by the value of the undershooting temperature even without cooling, the outer part is heated.

It is proposed to select or specify, or possibly even adjust during ongoing operation, preferably even adaptively, the undershooting temperature according to the application case. The undershooting temperature could also assume the value zero. In this case, the outer part would be cooled or heated in such a way that the outer part temperature is at least as high as the inner part temperature. This variant, accordingly that the outer part temperature is therefore intended to fall at most to the inner part temperature, is consequently an explicitly special case, in which the undershooting temperature has the value zero.

The undershooting temperature could also assume a negative value, and this would mean that the outer part temperature must be warmer than the inner part temperature. Allowance is made for this case specifically by it being proposed that the outer part temperature lies above the inner part temperature at least by an overshooting temperature. It is therefore assumed here that the overshooting temperature assumes a positive value. Therefore, here the outer part is specifically brought to a higher temperature than the inner part.

According to one embodiment, it is proposed that the outer part is electrically heated and/or the inner part is electrically relieved in dependence on the temperature difference. It is proposed for this purpose that, in the case where the generator, particularly a synchronous generator, is designed as an internal rotor, that is to say when the outer part forms the stator, a stator voltage is reduced. As a result, the stator current can be increased, in order thereby to warm the stator by increased ohmic losses in the stator. Therefore, here the voltage is reduced at corresponding stator terminals of the stator and this has the effect that the stator delivers a higher stator current. The output power, in simplified terms that is the product of the stator voltage and the stator current, can remain substantially the same here. The generator therefore continues to generate just as much power, which is in any case substantially dictated by the available wind power and the corresponding setting of the aerodynamic rotor. However, the ohmic losses in the stator, that is to say the line losses in the stator windings, are increased due to the increased stator current. As a result, the stator warms to a greater extent.

This therefore allows a heating of the stator to be performed in an easy way, in that its output voltage is reduced at the stator terminals.

In the case of a passive rectifier that is connected to the stator and rectifies to a first DC link, it may be set or controlled by the voltage of this first DC link being reduced. This may be performed for example by a stepup converter, which is arranged between this first DC link and a second DC link with a higher DC voltage, to mention just one example.

If the generator is designed as an external rotor, that is to say the outer part is the generator rotor, according to one embodiment a rotor current is increased in order to heat the generator rotor by increased ohmic losses in the rotor. This may be achieved for example by using as the generator a separately excited synchronous generator, in which the generator rotor is excited by an excitation current. In order therefore to heat the generator rotor, or heat it to a greater extent, this excitation current may be increased. This may take place for example by the excitation current being generated by a current adjuster and by the current adjuster increasing the excitation current correspondingly.

It is also considered here to provide instead of an increase in the power loss of the generator rotor, or in addition thereto, a reduction in the power loss of the stator by increasing the stator voltage. In this case where the generator is designed as the external rotor, according to one variant it is consequently proposed that a stator voltage is increased, in order to reduce the stator current in order to warm the stator less by the reduced losses in the stator.

According to a further embodiment, it is proposed that, for cooling the outer part, the temperature difference and the outer part temperature are monitored and the cooling of the outer part is started if the outer part temperature lies above the inner part temperature at least by the overshooting temperature or the outer part temperature lies above a limit temperature.

Consequently, a cooling takes place in dependence on a differential temperature in such a way that an excessive differential temperature is counteracted. Furthermore, however, an absolute temperature is monitored, to be specific the first limit temperature, which is likewise specified and optionally can be set, in particular can be changed adaptively. By this additional monitoring of the absolute temperature, consequently an overheating of the outer part is prevented. The cooling therefore functions in such a way that it initially controls the outer part temperature on the basis of the inner part temperature, that is to say particularly allows a somewhat higher temperature, but then intervenes in a cooling manner. This avoids cooling leading to a reduction in the air gap thickness. In addition, however, an overheating of the outer part is prevented.

It is preferably proposed for this that the cooling of the outer part has a variable cooling intensity and is increased in its cooling intensity as the outer part temperature increases further. Preferably, it is increased linearly as the outer part temperature increases further, from an initial cooling intensity to a maximum cooling intensity. This concerns both the case where the outer part temperature lies above the final temperature by the overshooting temperature, that is to say when there is a relative temperature increase, and the case where the outer part temperature lies above the first limit temperature, that is to say when there is an absolute temperature increase. Preferably, starting from the beginning of cooling, that is to say as from the overshooting of the inner part temperature by the overshooting temperature, or as from the first limit temperature, a further target temperature is set, which may be higher, for example by 10 K or 20 K. As a precaution, it is pointed out that it may of course also be considered in principle that the relative and absolute temperature monitoring respond at the same time.

According to one embodiment, it is proposed that a heating of the outer part is performed as soon as the outer part temperature lies above the inner part temperature by less than a minimum differential temperature. Preferably, this minimum temperature is chosen to be less than the overshooting temperature.

For example, it is advisable to choose the minimum differential temperature to be half the overshooting temperature. By this measure, firstly a clear criterion as to when the heating of the outer part takes place is set. Also, this heating is controlled depending on the differential temperature or a temperature difference. The combination with the cooling control is particularly advantageous. In this way, the differential temperature is monitored and the cooling is switched on as soon as the differential temperature has reached the value of the overshooting temperature. This particularly achieves the effect that no cooling of the outer part takes place in advance, but only as from the moment when there is this difference in temperature between the outer part temperature and the inner part temperature. If the difference is below that, cooling does not take place, unless the outer part becomes much too hot.

If therefore however the outer part temperature falls to the extent that it is only a little warmer than the inner part temperature, it is proposed to heat the outer part. However, this only takes place if it lies above the inner part temperature by less than the minimum differential temperature. If the outer part temperature therefore lies above the inner part temperature by a value that is greater than the minimum differential temperature, but less than the overshooting temperature, the outer part is neither heated nor cooled.

Preferably, the heating is variable, therefore has a variable heating output and is increased in its heating output as the outer part temperature falls further, this also being considered in relation to the inner part temperature. Preferably, this increase takes place linearly as the outer part temperature falls further, from an initial heating output to a maximum heating output. In the case of a predetermined differential temperature, that is to say for example 10 K below the inner part temperature, the maximum heating output may then be reached. If the outer part is a stator, the setting of the heating output may for example be achieved by the lowering of the stator voltage with the stator output remaining the same.

It is preferably proposed that the method operates adaptively. Particularly, the specifiable values are in this case adjusted or set adaptively. Preferably, such an adaptive process starts with a comparatively meaningful initial value, which is then adjusted.

In particular, it is proposed that the air gap thickness is monitored and, when a specifiable minimum thickness is undershot, a safety measure is initiated, in order to prevent contact between the outer part and the inner part. If therefore this minimum thickness is undershot, the safety measure is initiated and every time this safety measure is initiated this specifiable or changeable overshooting temperature is increased. For example, every time the safety measure is initiated, this specifiable overshooting temperature may be increased by 1 K or 5 K. The initiation is therefore taken to be a clear indication that the difference in temperature was not yet great enough, that therefore the outer part was still cooled too early.

It is preferably also provided that the overshooting temperature is reduced again step by step if the safety measure has not been initiated within a testing time period. If, therefore, the safety measure has not been initiated for example over a day, a week or a month, the overshooting temperature was probably sufficient and could at least be lowered again somewhat in order overall to be able to cool the generator somewhat better.

According to a further embodiment, it is proposed that a distinction is made between normal operation and reduced operation of the wind turbine. In reduced operation, the wind turbines are in this case operated with a reduced rotational speed as compared with normal operation, under the same wind conditions. Reduced operation may for example concern a reduction in the rotational speed for the purpose of reducing noise. For this purpose, it is therefore proposed that the method for cooling the generator uses different parameter values in normal operation than in reduced operation. In particular, it is proposed that the overshooting temperature and also or alternatively the limit temperature are chosen to be different. For this purpose, alternative sets of parameters may be stored. A proposed adaptive method, in which the adaptation respectively concerns the current parameters of the current operating mode, may also be used. If, therefore, the wind turbine is for example operated in the reduced operating mode and the adaptation provides that the overshooting temperature is to be reduced, only the value of the overshooting temperature of the dataset for this reduced operation is adapted. Consequently, allowance can be made overall for the respective special characteristic of normal operation or reduced operation in an easy way.

It is preferably proposed that different cooling media and also or alternatively different types of cooling are provided for the inner part and the outer part. With these different cooling media or types of cooling, allowance can be made for the special characteristics of the outer part and the inner part. Furthermore, different cooling outputs, and in particular cooling results, can also be achieved by different cooling media or types of cooling. By making allowance for the differential temperature between the outer part temperature and the inner part temperature, it is possible however in this way to make allowance for different cooling results. Particularly, it is possible to counteract an effect by which for example an inner cooling operates less efficiently, in particular produces an inferior cooling result and could thereby lead to a greater thermally induced expansion of the inner part. This can be specifically counteracted by making allowance for the differential temperature.

An advantage that is particularly obtained here is that it is less problematic to use different types of cooling for the inner part on the one hand and the outer part on the other hand if a method according to the invention is used.

Coming into consideration in particular as different cooling media are air on the one hand and a liquid cooling medium such as water or water with additives on the other hand. Particularly coming into consideration as different types of cooling are an active cooling on the one hand, in which a cooling medium is actively moved along the part to be cooled, and a passive cooling on the other hand, in which particularly an air stream along the part to be cooled is made possible, but is not necessarily promoted by additional actuators.

Preferably, an air cooling and/or a passive cooling is proposed for the inner part and a water cooling, in particular an active cooling, is proposed for the outer part According to the invention, a wind turbine is also proposed. It has a generator with a stator and a generator rotor and in between an air gap with an air gap thickness. The generator may be designed as an internal rotor or as an external rotor. If the generator is designed as an internal rotor, it has a stator as the outer part and a generator rotor as the inner part. If the generator is designed as an external rotor, it has the generator rotor as the outer part and the stator as the inner part.

In any event, an outer part temperature measuring means is provided for detecting a temperature of the outer part as an outer part temperature. An inner part temperature measuring means is also provided, for detecting a temperature of the inner part as an inner part temperature. Each of these temperature measuring means may respectively have one or more temperature sensors, which are preferably arranged distributed over a circumference of the generator, and consequently in any event over a circumference of the outer part or inner part.

Furthermore, a difference means for forming a temperature difference as the difference between the outer part temperature and the inner part temperature is provided. This allows a difference that forms the temperature difference to be formed from the outer part temperature and the inner part temperature. As a basic principle, the temperature difference, which consequently forms a difference between the outer part temperature and the inner part temperature, may also be synonymously referred to as the part temperature difference. This is so because the temperature difference refers to the difference between the temperatures of the two parts, that is to say the outer part and the inner part. If a number of temperature sensors are respectively used for the outer part temperature measuring means and the inner part temperature measuring means, an average value of the detected temperatures may be used in each case, or the greatest detected value may be used in each case.

Finally provided is a control means, which is prepared for controlling the generator in dependence on the temperature difference so as to counteract a reduction in the air gap thickness due to thermal expansion of the generator.

The control takes place in particular as explained above according to at least one embodiment of the method for controlling the wind turbine.

Preferably, the wind turbine has an inner cooling device for cooling the inner part and also or alternatively has an outer cooling device for cooling the outer part. Consequently, a cooling device is respectively provided for the outer part and the inner part.

Preferably, different cooling media and or types of cooling are provided for the inner cooling device and the outer cooling device. In particular, it is provided that the inner cooling device is designed as air cooling and also or alternatively as passive cooling. For the outer cooling device, it is preferably provided that it is designed as water cooling.

Consequently proposed is a gearless wind turbine which is characterized in that it is designed to carry out a method according to at least one embodiment described above.

In particular, for this purpose the described method is entirely or partially implemented in the control means. The difference means provided may also be implemented as software, in particular implemented in the control means or a separate device.

The temperature difference may also be represented differently, such as for example as a factor. If for example there is a temperature range of 80 to 120 degrees Celsius, this corresponds to an absolute temperature of 352 to 392 K. A temperature difference of 3.5 K could then also be represented for instance by a factor of 1.01.

BRIEF DESCRIPTION OF THE SEVERAL VIEWS OF THE DRAWINGS

The invention is explained in more detail below by way of example on the basis of at least one specific exemplary embodiment in an exemplary manner with reference to the accompanying figures.

DETAILED DESCRIPTION

Figure 1:
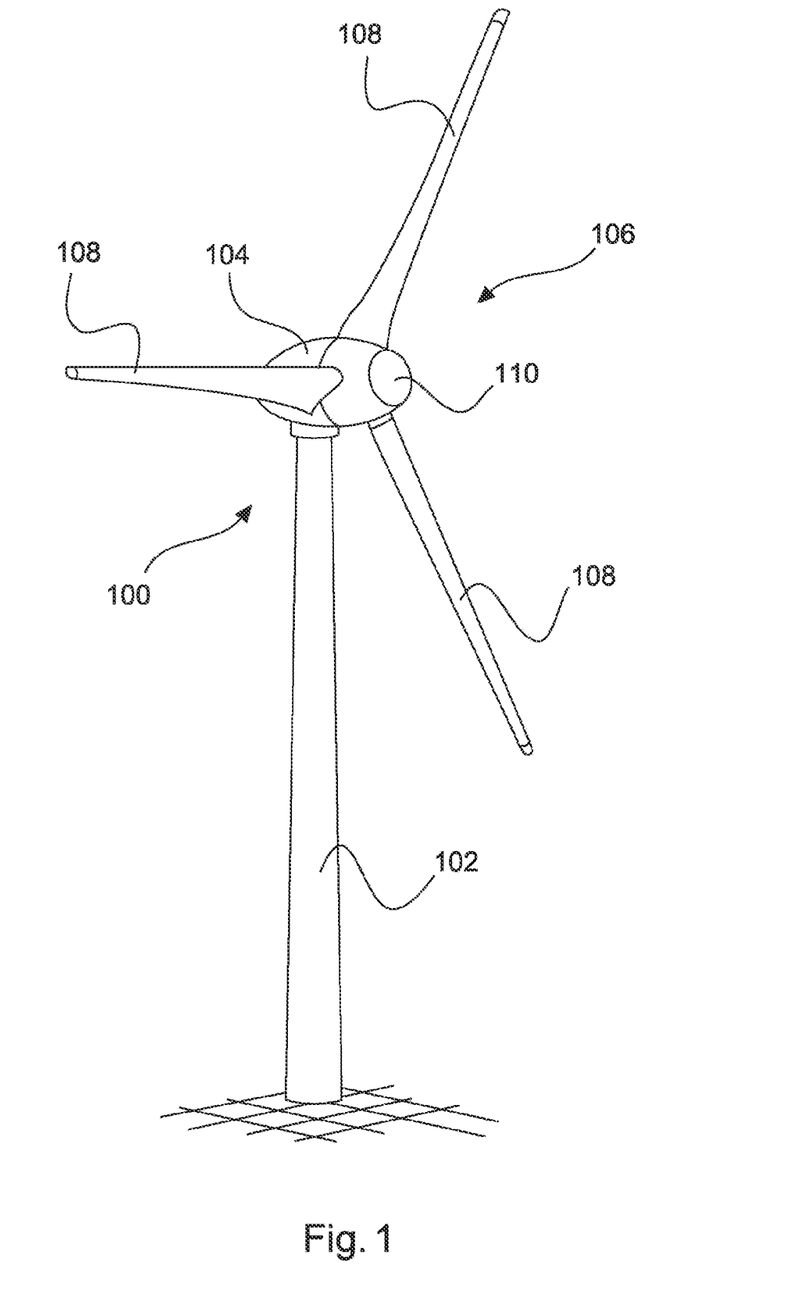
FIG. 1 shows a wind turbine in a perspective view.

FIG. 1 shows a wind turbine 100 with a tower 102 and a nacelle 104. A rotor 106 with three rotor blades 108 and a spinner 110 is arranged on the nacelle 104. The rotor 106 is caused to rotate by the wind during operation and thereby drives a generator in the nacelle 104.

Figure 2:
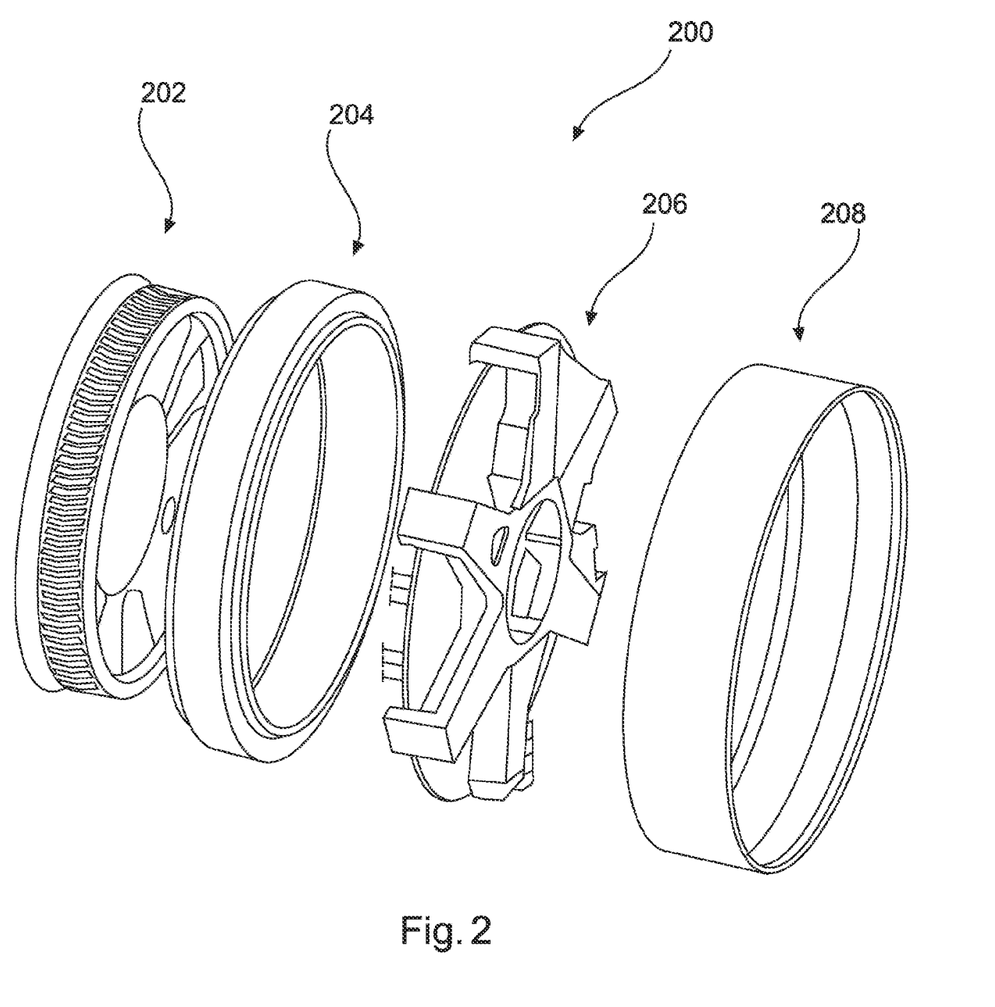
FIG. 2 shows part of a generator in an exploded view.

FIG. 2 shows a generator 200 with a generator rotor 202 and a stator 204. The generator 200 is designed here as an internal rotor and, for use as intended, the generator rotor 202 is pushed into the stator 204, and then turns inside this stator 204. A thin air gap then forms between this generator rotor 202 and the stator 204.

Also shown is a stator support 206, on which the stator 204 is fastened as intended. These three elements, to be specific the generator rotor 202, the stator 204 and the stator support 206, are then substantially surrounded during use as intended by a casing 208 that is likewise shown.

Figure 3:
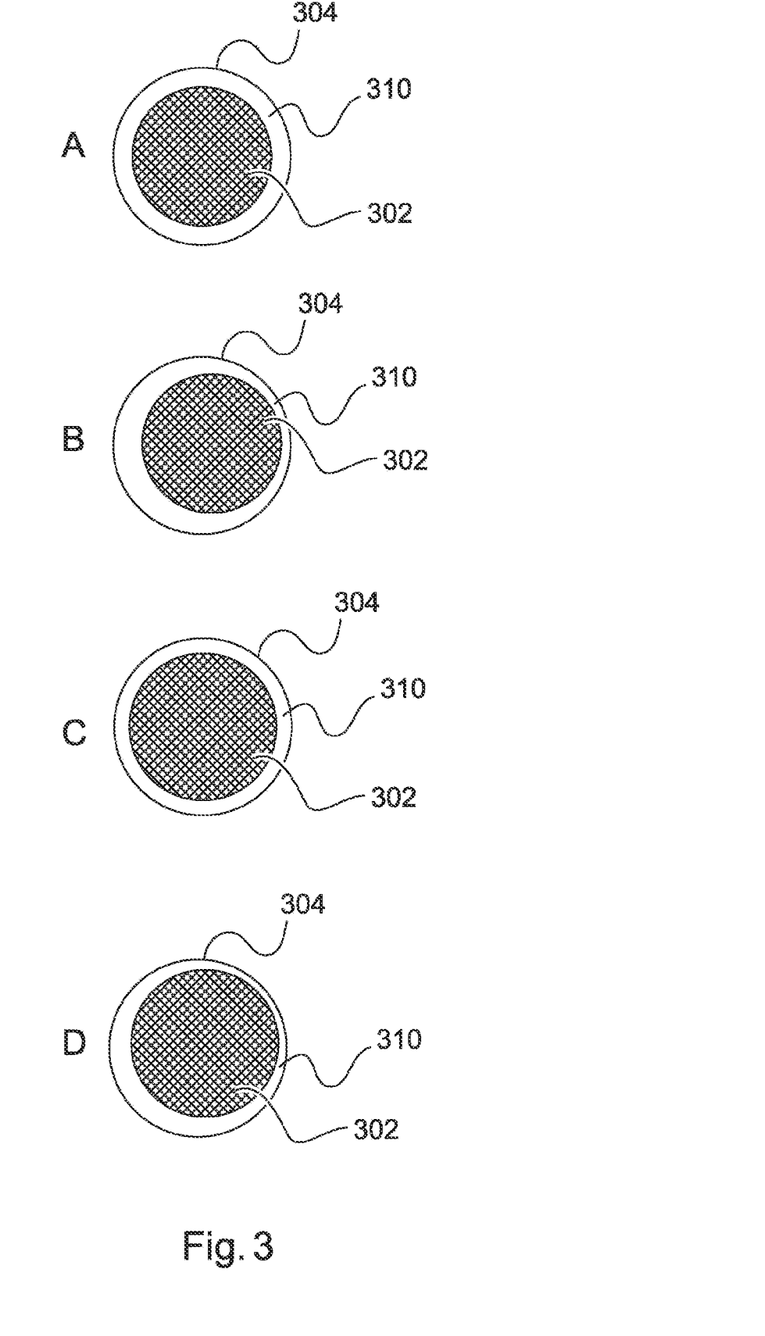
FIG. 3 schematically shows different possible situations for an air gap.

FIG. 3 illustrates four basic situations for an air gap 310, which in all four representations is denoted by the same reference sign. Likewise, all four states consequently also show a generator rotor 302, illustrated by the inner circle, and a stator 304, or the inner limit of the stator 304, illustrated by the greater outer circle.

In FIG. 3, situation A shows a desired state or ideal state in which the generator rotor 302 is ideally arranged concentrically in the stator 304. In this way, the air gap 310 also runs uniformly between these two components. What is more, the air gap 310 is not too thin.

Case B shows an eccentric situation, in which the generator rotor 302 is no longer arranged exactly concentrically in the stator 304. The result is that the air gap 310 no longer has the same thickness everywhere, but has become comparatively thin in one region and comparatively thick in another region. Although situation B is not optimal, it allows continued operation of the generator concerned.

Situation C shows a situation in which the generator rotor 302 is arranged substantially concentrically in the stator 304, in which however the air gap 310 is reduced in size, at least in comparison with situation A. This may be the result of an expansion of the generator rotor 302, while the stator 304 has not expanded, or not to such a great extent. However, also in the case of situation C the generator is still operable.

Situation D then shows a situation in which the air gap 310 has become so thin at one point that a safety measure is initiated. In situation D, both the air gap 310 as a whole is reduced in size, such as due to an expansion of the generator rotor 302, and the generator rotor 302 is no longer arranged concentrically in the stator 304. This causes this very thin air gap 310 in one region and the mentioned initiation of a safety measure, which may also be referred to as tripping of an air-gap switch.

FIG. 3 only illustrates various possibilities of a state of the air gap 310. This has been described for the case of an internal rotor in which the generator rotor 302 forms the inner part and the stator 304 forms the outer part. The same explanations also apply analogously however if the generator is designed as an external rotor, that is to say if the generator rotor is on the outside and the stator is on the inside. That would correspond to FIG. 3, with the difference that the rotor 302 would be a stator and the stator 304 would be a rotor.

Figure 4:
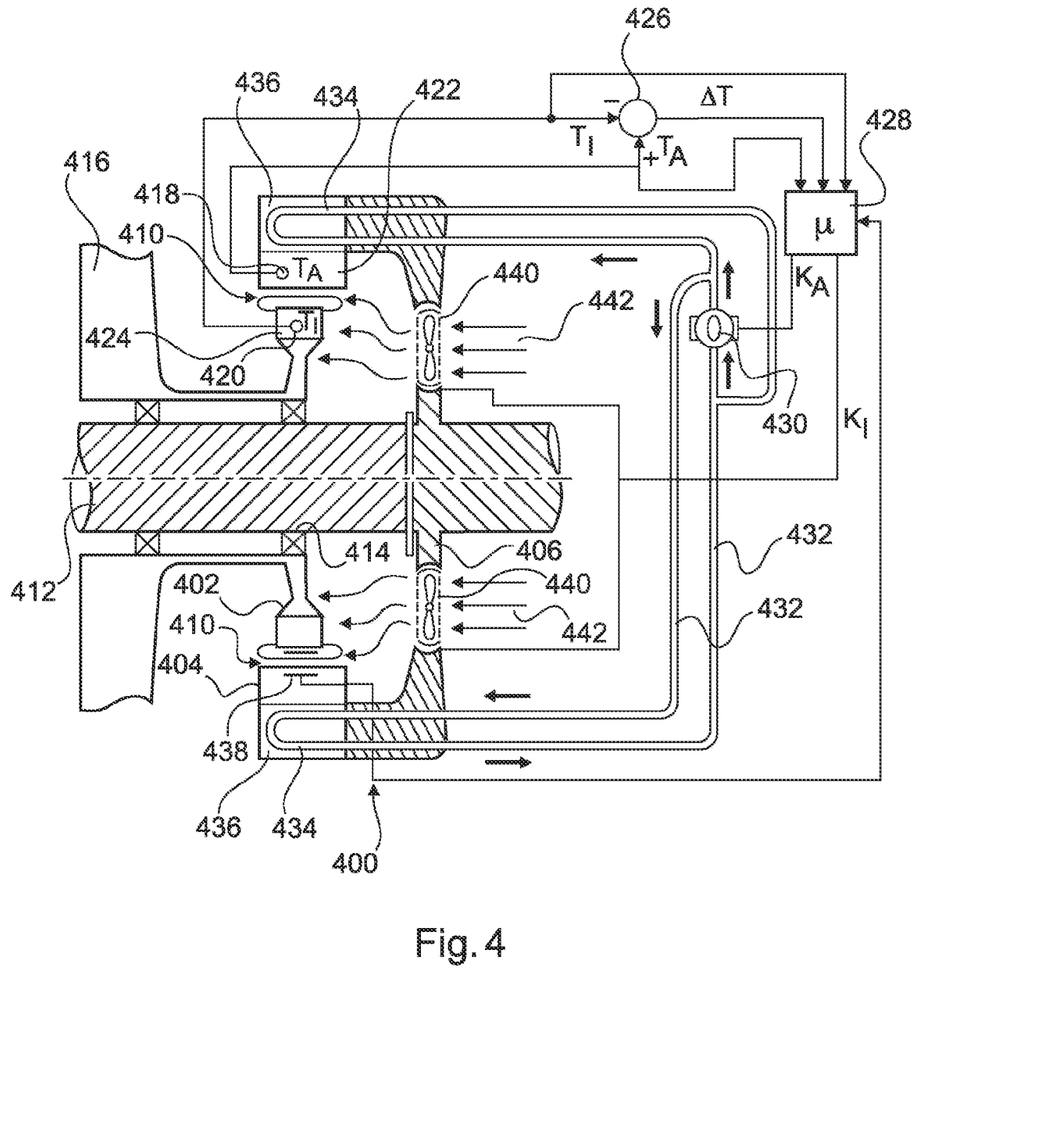
FIG. 4 schematically shows a control arrangement.

FIG. 4 illustrates a control concept or a control structure for controlling particularly the cooling of the generator 400, which is shown in section for purposes of illustration. Also used here by way of example as the generator 400 is an internal rotor, which has a generator rotor 402 and a stator 404. The generator rotor 402 is rotatably mounted on a journal 412 by two bearings 414. Fastened to the journal 412 is a stator support 406, which fixedly supports the stator 404. The stator support 406 is finally held on a bed plate, which is not shown here. The journal 412 and the stator support 406 are shown hatched, to illustrate that they are the essential load-bearing elements here. Other elements, such as also the stator 404 and the generator rotor 402, also have in principle sectional areas, which however are not shown hatched here, especially since the specific detailed structural design does not matter.

Otherwise, fixedly connected to the generator rotor 402 is a hub 416, which may bear three rotor blades, in order thereby to turn the hub 416, and consequently the generator rotor 402, when there is corresponding wind.

Between the generator rotor 402 and the stator 404, an air gap 410 is formed. An outer sensor 418 and an inner sensor 420 are also respectively shown. The outer sensor 418 is arranged in the region of laminated stator cores 422 of the stator 404, and here is representative of an outer part temperature measuring means, which may also comprise further sensors.

The inner sensor 420 is arranged in the region of pole shoes 422 of the generator rotor 402, and here is representative of an inner part temperature measuring means, which may also comprise further sensors.

The outer sensor 418 detects an outer part temperature $T_A$ and the inner sensor 420 detects an inner part temperature $T_1$. These two temperatures are subtracted from one another at a summing (or subtraction) circuit 426, so that a differential temperature $\Delta T$, which may also be referred to as the part temperature difference, is obtained as the difference or temperature difference. This temperature difference $\Delta T$ is obtained from the outer part temperature $T_A$ and the inner part temperature $T_1$ according to the equation:

$$\Delta T = T_A - T_I$$

The differential temperature $\Delta T$ and also the outer part temperature $T_A$ and the inner part temperature $T_1$ are entered as input variables into a controller 428. The summing (or subtraction) circuit 426 otherwise serves as a difference means.

The controller 428 may therefore activate a cooling of the generator 400 in dependence on the differential temperature $\Delta T$ or the temperature difference with the two individual temperatures. For this purpose, a liquid cooling with a cooling pump 430, cooling channels 432 and cooling coils 434 is provided for the stator 404. For purposes of illustration, the cooling coils 434 are arranged here in a stator supporting ring 436 of the stator 404. The stator supporting ring 436, which is held by the stator support 406, for its part holds in turn the laminated stator cores 422, which is only sketched here for purposes of illustration.

If therefore the differential temperature $\Delta T$ lies above a specifiable overshooting temperature, or the absolute value of the outer part temperature $T_A$ lies above a first limit temperature, the cooling pump 430 is put into operation by the cooling signal $K_A$ for the outer cooling, and a liquid cooling medium is pumped through the cooling coils 423 according to the arrows indicated at the cooling channels 432. If the differential temperature $\Delta T$ or the absolute outer part temperature $T_A$ increases still further, with this rise the pumping output, and consequently the delivery output, of the cooling pump 430 can be linearly increased further. The controller 428 may carry out this control.

Also shown in addition is a distance sensor 438, which measures the air gap thickness of the air gap 410 and is shown by way of example for various further such distance sensors that may be provided in order to detect at further positions of the air gap 410 the thickness thereof. As illustrated in FIG. 4, the result may be evaluated in the controller 428.

In this way, the stator 404, and consequently the outer part, undergoes a cooling by means of a liquid medium by way of the cooling pump 430, the cooling channels 432 and the cooling coils 434. This consequently forms an outer cooling device. For cooling the generator rotor 402, and consequently the inner part, fans 440 are provided in the stator support 406. These fans 440 respectively force an air stream 442 through the stator support, which may be designed here as a bell-shaped construction and may also be referred to as a stator bell, toward the generator rotor 402. There, the air stream may divide and flow through different openings in the generator rotor 402 and also through the air gap 410.

The fans 440, which consequently form an inner cooling device, may likewise be activated by way of the controller 428. For this purpose, the controller 428 sends a cooling signal for the inner cooling device $K_1$.

In this way, the generator rotor 402 and the stator 404 can be controlled independently of one another in their cooling. This control is undertaken in the example of FIG. 4 by the controller 428. Particularly, the outer part temperature $T_A$ is controlled in dependence on the differential temperature $\Delta T$. Allowance for the absolute value of the outer part temperature $T_A$ may nevertheless also be made directly. Particularly, it is proposed that the cooling of the stator 404, and consequently the outer part cooling, only begins if the outer part temperature $T_A$ lies above the inner part temperature $T_I$ by an overshooting temperature. The inner part temperature may in principle be controlled conventionally, to be specific in particular depending on the inner part temperature $T_1$ detected.

Therefore, in principle the system reaches a higher outer part temperature $T_A$ than the inner part temperature $T_1$. This avoids the generator rotor 402 thermally expanding radially to a greater extent than the stator 404, so that as a result it is avoided that the overall air gap thickness is reduced. Should an air gap thickness that is too small nevertheless happen to occur, this can be detected by the distance sensor 438, and if need be a safety measure is initiated.

In any event, however, such safety measures can be avoided by the proposed thermal control, or it is possible to make the air gap thicknesses particularly small. It is also possible to make allowance specifically for particular operating modes, particularly a sound-reduced operating mode. Particularly in the case of a sound-reduced operating mode, it may in fact be provided that, with as much power output as possible, which of course is always the aim, a rotational speed that is as low as possible is used. Particularly in the case of an air-cooled internal rotor, that may cause comparatively great warming, and consequently disproportionately great thermal expansion.

Particularly when using conventional generator temperature controls, in which it is only depending on absolute temperatures that cooling is switched on and off, such differentiated consideration cannot be undertaken.

It is consequently ensured by the differential temperature control that the stator always becomes warmer than the rotor of the generator, which is referred to here as the generator rotor. This statement applies to an internal rotor and it applies conversely in the case of an external rotor, to be specific that it is ensured by the differential temperature control that the generator rotor is always warmer than the stator. A precondition for the proposed control is that the outer part and the inner part have separate cooling or heating systems, at least that the outer part can be cooled or heated independently of the inner part. Therefore, the outer part of the generator can then be kept warmer than the inner part, so that the outer part undergoes greater thermal expansion than the inner part, and this does not result in the initiation of air gap monitoring, that is to say a safety measure caused by an air gap that is too thin.

Particularly, the proposed solution can be used to improve an existing situation in which, in the case of an internal rotor, the stator cooling was controlled in dependence on the absolute stator temperature, the stator cooling only being stopped as long as the rotor cooling, that is to say the cooling of the generator rotor, was inoperative. It could have happened here that, if with the full cooling output the rotor is warmed to a greater extent than the stator, it then expanded too much and tripping of an air-gap switch was able to occur.

This has provided a solution in which the generator cooling, in particular the stator cooling in the case of an internal rotor, is activated depending on the difference between the outer part temperature and the inner part temperature. It is thereby ensured that the temperature of the stator is above that of the rotor, that is to say the generator rotor.

A development can be achieved by adaptively correcting parameters, particularly switch-on and switch-off temperature thresholds, according to how often tripping of the air-gap switch takes place, that is to say according to how often the undershooting of an air gap thickness was detected and a safety trip carried out. As a result, an excessive stator warming, in the case of an internal rotor with correspondingly higher stator losses, can be avoided.

A further aspect is that, whenever the desired differential temperature cannot be reached just by activating the cooling, it is proposed to additionally heat the stator if the stator forms the outer part. This heating can be achieved by lowering the stator voltage, whereby the stator currents increase, and consequently more stator losses occur and thereby heat the stator. As a result, even with the stator cooling deactivated, an adjustment of the stator temperature to the rotor temperature, that is to say the generator rotor temperature, can be made possible.

It is consequently an aspect of the present invention that the outer part, for example the stator in the case of an internal rotor, is operated in such a way that it is at least just as warm as the inner part, in the example of the internal rotor that is to say the generator rotor. It is in this way intended to ensure that the operationally induced influences of the reduction in size of the air gap have virtually no influence any longer.

If an internal rotor is therefore assumed, the stator is heated if it is not hot enough, that is to say if it lies below a specified differential temperature in comparison with the rotor. For this purpose, it is proposed here to lower the stator voltage, and thereby increase the current, while the power output remains approximately the same. This increasing current increases the ohmic losses in the stator, which is warmed as a result.

It is therefore preferably proposed to specify for the heating a separate differential temperature range, in which specifically the heating is to be started when a second differential temperature, also referred to here as the minimum differential temperature, is undershot. For this purpose, it is also proposed to lower the stator voltage in proportion to the regular setpoint value for it, to be specific proportionally such that a maximum lowering of the stator voltage is achieved at the end of a second differential temperature range. This second differential temperature range may refer to a value of the outer part temperature that lies below the inner part temperature, for example by 10 K below the current inner part temperature value. Until here, the stator voltage is therefore lowered by a maximum value, and consequently the maximum heating of the stator thereby achievable or acceptable is achieved.

If therefore, for example, the stator temperature lies above the generator rotor temperature by a second differential temperature or less, that is to say for example only 5 K above the generator rotor temperature, heating may be carried out, particularly by the described lowering of the stator voltage. This heating may be further increased as the outer part temperature or temperature difference falls further, until the end of a second differential range, which may for example lie 10 K below the generator rotor temperature, is reached. In this example mentioned, the stator voltage is therefore lowered, particularly lowered linearly, from a normal value, and beginning at a differential temperature of 5 K above the generator rotor temperature to a value of for example 10 K below the current generator rotor temperature. Consequently, for instance, a linear rise of the heating output is also achieved.

With respect to the cooling control, it should also be mentioned that, for example in the case of an internal rotor, it was previously started at an absolute temperature value, such as for example 80 degrees Celsius of the stator slot temperature, and had reached the maximum cooling output at a slot temperature of 100 degrees Celsius. Instead, for this example the stator cooling is therefore started when the stator slot temperature is 20 K above the rotor pole shoe temperature, that is to say 20 K above the generator rotor temperature.

Preferably, a water cooling with adjustable volumetric flow is provided for the outer part, that is to say in the case of an internal rotor for the stator. For example, this water cooling may be begun with a low volumetric flow when there is a differential temperature of 20 K, and a maximum volumetric flow reached when there is a differential temperature of 30 K. A linear profile is preferably proposed here.

To be on the safe side, cooling may also be additionally started depending on an absolute value, such as for example a temperature of the stator of 130 degrees Celsius. Then, whenever the cooling has not already been started on the basis of the differential temperature, the cooling can be started at that value and reaches its maximum value up to a further value of 140 degrees Celsius. It is in this way ensured that the stator is in any event cooed if such a high temperature is reached.

It is therefore achieved that the thermal expansion of the outer part, that is to say in the case of an internal rotor the stator, is as far as possible always greater than the expansion of the inner part, that is to say in the case of the internal rotor the generator rotor.

It is also proposed not to specify the parameters of the differential temperature control as fixed values but to allow them to be adopted by learning. It is proposed that, with each air gap event, the differential temperature to be calculated, that is to say the temperature from which cooling is started, is increased. When it then happens that no more air gap events occur, it is assumed that the corresponding value is sufficient. These values may then possibly be lowered again. Initiation of a safety measure when the air gap thickness has become too small is to be understood as an air gap event.

Particularly in the case of sound-reduced operation, it is proposed to use learning to adopt a dedicated set of parameters, which differs from optimum operation in terms of power, that is to say basically normal operation. This proposal applies in particular to a separately excited synchronous generator as an internal rotor. In the case of the latter in a sound-reduced operating mode the wind turbine can be operated with the same power output but with reduced rotational speed. For this purpose, the rotor or the generator rotor requires more excitation power, and therefore a greater excitation current is delivered to the generator rotor or rotor, which as a result becomes hotter. There is then therefore a greater risk of the generator rotor as the inner part expanding to a greater extent than the stator as the outer part.

In detail, the procedure followed may be such that first an initial setting is made at the factory. Preferably, such an initial setting is made at the factory that no differential-temperature-dependent control takes place.

If the tripping of a safety shutdown then takes place on account of a detected air gap thickness that is too small, the proposed differential control, that is to say the control particularly of the cooling in dependence on the differential temperature, can then be activated. For example, a value of an overshooting temperature may be set to 20 K. It is therefore then provided as an initial value that a cooling of the outer part only begins when the outer part temperature lies above the inner part temperature by at least 20 K.

If then, after a predetermined resetting time, which may be for example more than 3, 5 or 10 hours, no fault has occurred, it is proposed to reduce this overshooting temperature step by step.

If, however, a shutdown occurs once again, it may be provided to increase the overshooting temperature again step by step and to re-start the wind turbine. Preferably, an increasing step after the occurrence of a safety trip assumes a greater absolute value than a reducing step after an extended period of trouble-free operation. For example, a reducing step may be 5 K, while an increasing step may be 10 K.

If safety trips keep occurring due to an air gap detected as too small, a maximum value may be provided for the overshooting temperature.

Although it can then still happen that the wind turbine is stopped on account of a described safety trip, it can start again automatically, particularly with a changed value of the overshooting temperature.

The invention claimed is:

1. A method comprising:
controlling a gearless wind turbine, the wind turbine having a generator comprising a stator, a generator rotor, and an air gap between the stator and the generator rotor with an air gap thickness, wherein one of the stator or the generator rotor is an outer part and the other is an inner part, wherein the controlling comprises:
detecting a temperature of the outer part as an outer part temperature,
detecting a temperature of the inner part as an inner part temperature,
determining a temperature difference between the outer part temperature and the inner part temperature,
controlling the generator in dependence on the temperature difference to counteract a reduction in the air gap thickness due to thermal expansion of the generator by monitoring the air gap thickness, and when a specifiable minimum thickness is obtained, initiating a safety measure to prevent contact between the outer part and the inner part,
when the safety measure is initiated, increasing an overshooting temperature, which indicates a temperature value by which the outer part temperature should be above the inner part temperature, and
reducing the overshooting temperature when the safety measure has not been initiated within a testing time period.

2. The method as claimed in claim 1, wherein the controlling the generator comprises cooling or heating the outer part in dependence on the temperature difference to thereby counteract the reduction in the air gap thickness.

3. The method as claimed in claim 2, wherein controlling the generator comprises operating the generator in a reduced operation mode or in a normal operation mode,
wherein in the reduced operation mode, the wind turbine is operated with a reduced rotational speed as compared with normal operation under similar wind conditions, and
wherein controlling the generator further comprises cooling the generator using different parameter values in normal operation than in reduced operation.

4. The method as claimed in claim 1, wherein the controlling the generator comprises cooling or heating the outer part such that:
the outer part temperature is less than the inner part temperature at most by an undershooting temperature,
the outer part temperature is at least as high as the inner part temperature, or
the outer part temperature is greater than the inner part temperature at least by the overshooting temperature.

5. The method as claimed in claim 4, wherein the controlling the generator comprises:
heating the outer part when the outer part temperature is less than the inner part temperature by a minimum differential temperature, wherein the minimum differential temperature is less than the overshooting temperature,
wherein the heating has a variable heating output and is increased in its heating output as the outer part temperature falls further in relation to the inner part temperature.

6. The method as claimed in claim 5, wherein the heating increases linearly as the outer part temperature falls further in relation to the inner part temperature, from an initial heating output to a maximum heating output.

7. The method as claimed in claim 1, wherein the controlling the generator comprises heating at least one of: the outer part or the inner part.

8. The method as claimed in claim 7, wherein the inner part is the rotor, wherein the heating comprises reducing a stator voltage in order to increase a stator current to thereby warm the stator by increased ohmic losses in the stator.

9. The method as claimed in claim 1, wherein the controlling the generator comprises cooling the outer part, wherein the temperature difference and the outer part temperature are monitored and the cooling of the outer part is started if:
the outer part temperature is greater than the inner part temperature at least by the overshooting temperature, and
the outer part temperature is greater than a first limit temperature,
wherein the method further comprises
increasing the cooling intensity of the cooling of the outer part from an initial cooling intensity to a maximum cooling intensity if the outer part temperature continues to increase.

10. The method as claimed in claim 1, wherein the controlling the generator comprises cooling the inner part using air flow.

11. A gearless wind turbine configured to carry out the method as claimed in claim 1.

12. The method as claimed in claim 1, wherein the outer part is the rotor and the inner part is the stator.

13. The method as claimed in claim 1, wherein the outer part is the stator and the inner part is the rotor.

14. The method as claimed in claim 1, wherein the controlling the generator comprises cooling the outer part using water.

15. The method as claimed in claim 1, wherein the outer part is the rotor, wherein the controlling the generator comprises increasing a stator voltage in order to reduce a stator current in order to reduce a temperature of the stator.

16. A gearless wind turbine comprising:
- a generator having a stator, a generator rotor, and an air gap between the stator and the generator rotor, wherein the air gap has an air gap thickness, wherein one of the stator or the generator rotor is an outer part and the other is an inner part,
- an outer part temperature measuring means for detecting a temperature of the outer part as an outer part temperature,
- an inner part temperature measuring means for detecting a temperature of the inner part as an inner part temperature,
- summing or subtraction circuitry for determining a temperature difference between the outer part temperature and the inner part temperature,
- a controller configured to control the generator in dependence on the temperature difference to counteract a reduction in the air gap thickness due to thermal expansion of the generator, wherein the controller is configured to monitor the air gap thickness, and when a specifiable minimum thickness is obtained, to initiate a safety measure to prevent contact between the outer part and the inner part,
- means for increasing an overshooting temperature, which indicates a temperature value by which the outer part temperature should be above the inner part temperature when the safety measure is initiated by the controller, and
- means for reducing the overshooting temperature again if the safety measure has not been initiated within a testing time period.

17. The gearless wind turbine as claimed in claim 16, further comprising at least one of:
- an inner cooling device configured to cool the inner part, or
- an outer cooling device configured to cool the outer part.

18. The gearless wind turbine as claimed in claim 17, wherein the inner cooling device is configured to cool the inner part using air, wherein the outer cooling device is configured to cool the outer part using water.

\* \* \* \* \*